(12) United States Patent
Muñoz Sanchez et al.

(10) Patent No.: US 12,132,645 B2
(45) Date of Patent: Oct. 29, 2024

(54) SYSTEMS AND METHODS FOR MANAGING TRAFFIC OF A PRIVATE NETWORK IN RELATION TO A BACKHAUL FAILOVER

(71) Applicant: Verizon Patent and Licensing Inc., Basking Ridge, NJ (US)

(72) Inventors: Hugo D Muñoz Sanchez, Bedminster, NJ (US); Abdessamad Krieche, Milford, MA (US); Landon W Stogner, Flower Mound, TX (US); Francisco A Varela, Union, NJ (US); Maria Cel Halili Zaballero, Ramsey, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 387 days.

(21) Appl. No.: 17/455,360

(22) Filed: Nov. 17, 2021

(65) Prior Publication Data
US 2023/0155922 A1 May 18, 2023

(51) Int. Cl.
*H04J 1/16* (2006.01)
*H04L 45/00* (2022.01)
*H04W 16/14* (2009.01)

(52) U.S. Cl.
CPC ............ *H04L 45/22* (2013.01); *H04W 16/14* (2013.01)

(58) Field of Classification Search
CPC ........ H04L 45/22; H04L 12/14; H04W 16/14; H04W 4/24; H04W 24/04; H04W 40/02; H04M 15/00; H04M 15/61; H04M 15/8016; H04M 15/8044; H04M 15/8055
USPC .......................................................... 370/225
See application file for complete search history.

(56) References Cited

U.S. PATENT DOCUMENTS

| | | | |
|---|---|---|---|
| 2009/0028169 A1* | 1/2009 | Bear | H04L 47/24 370/406 |
| 2009/0041039 A1* | 2/2009 | Bear | H04L 47/125 370/401 |
| 2018/0343567 A1* | 11/2018 | Ashrafi | H04L 43/20 |
| 2019/0069187 A1* | 2/2019 | Ashrafi | H04L 41/5054 |
| 2021/0234592 A1* | 7/2021 | Ashrafi | H04B 7/0617 |
| 2021/0352488 A1* | 11/2021 | Khawer | H04W 88/14 |
| 2021/0400527 A1* | 12/2021 | Notargiacomo | H04L 47/12 |
| 2022/0070693 A1* | 3/2022 | Saghir | H04W 52/245 |
| 2022/0141894 A1* | 5/2022 | Akl | H04W 40/22 370/329 |
| 2023/0027233 A1* | 1/2023 | Kumar | H04W 40/36 |
| 2023/0142951 A1* | 5/2023 | Maria | H04W 12/086 455/411 |

* cited by examiner

*Primary Examiner* — Chuong T Ho

(57) ABSTRACT

A device sends, based on information indicating that a primary backhaul link of a private network is down, at least one message to a controller of the private network. The at least one message indicates that the controller is to activate at least one route condition policy, and the at least one message, when received by the controller, is to cause the controller to activate the at least one route condition policy. The device sends, based on the information, at least one additional message to a baseband unit (BBU) of the private network. The at least one additional message indicates that the BBU is to apply one or more spectrum sharing parameters for the private network, and the at least one additional message, when received by the BBU, is to cause the BBU to apply the one or more spectrum sharing parameters.

20 Claims, 9 Drawing Sheets

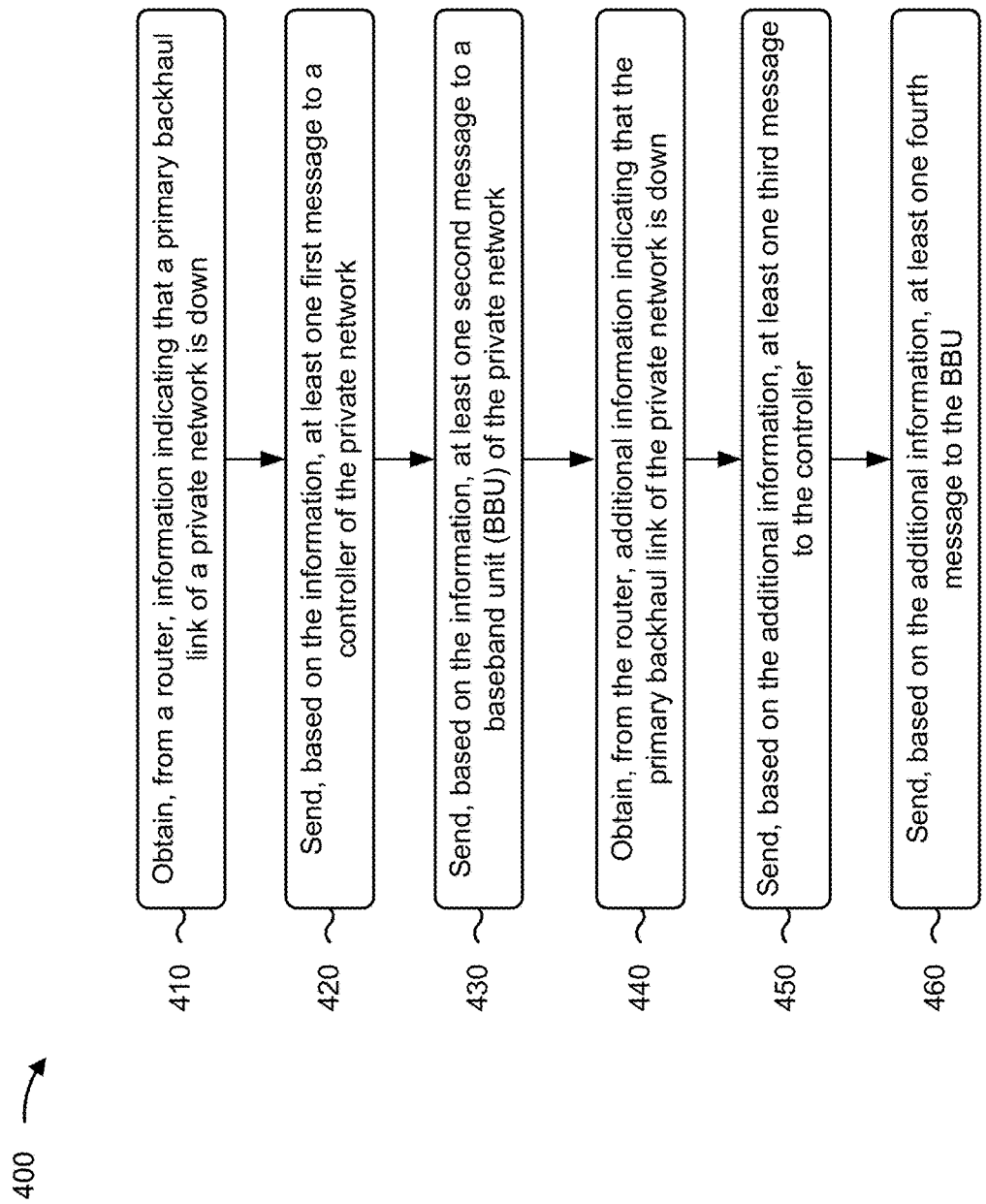

SYSTEMS AND METHODS FOR MANAGING TRAFFIC OF A PRIVATE NETWORK IN RELATION TO A BACKHAUL FAILOVER

BACKGROUND

A typical backhaul provides a plurality of backhaul links to connect an access network to a core network. The plurality of backhaul links may comprise wired backhaul links and/or wireless backhaul links.

BRIEF DESCRIPTION OF THE DRAWINGS

FIG. 4 is a flowchart of an example process relating to managing traffic of a private network in relation to a backhaul failover.

DETAILED DESCRIPTION OF EXAMPLE EMBODIMENTS

Figure 1A:
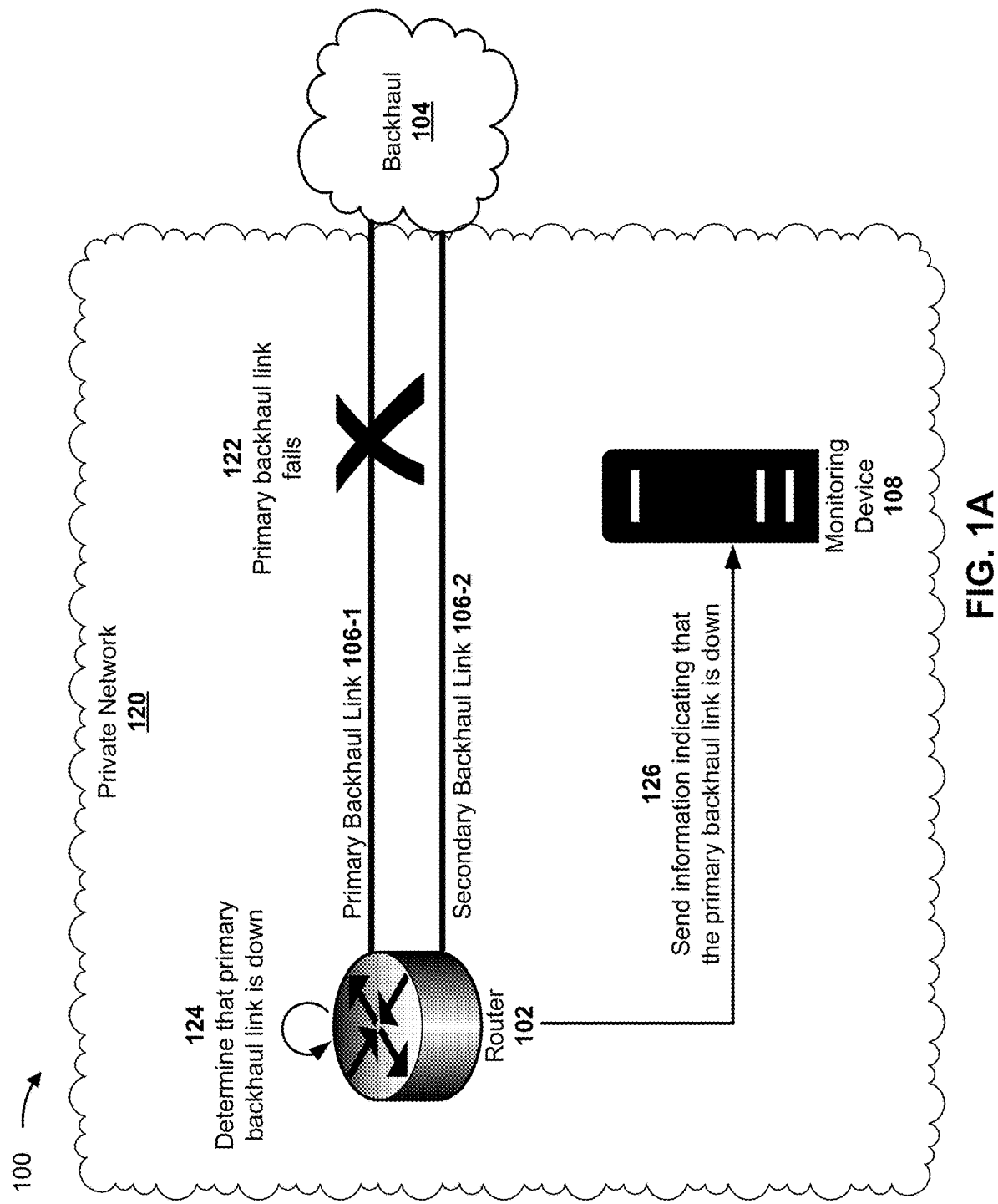
FIGS. 1A-1F are diagrams of an example associated with managing traffic of a private network in relation to a backhaul failover.

The following detailed description of example implementations refers to the accompanying drawings. The same reference numbers in different drawings may identify the same or similar elements.

A private network comprises a communication network, such as cellular network, that is configured to provide wireless communications and/or services for user devices associated with an entity (e.g., a company, an organization, or a university, among other examples) and/or that are within a region of physical coverage of the private network. Often, the private network includes a radio access network (RAN) and a private core network. A router of the private network can route traffic between user devices associated with the entity (e.g., via the RAN) and the private core network.

Moreover, the router can be connected to a backhaul that provides access to a private data network and/or at least one public network, such as public core network and/or a public data network (e.g., of a public cellular network). In many cases, the router is connected to the backhaul via a primary backhaul link and a secondary backhaul link (also referred to as a backup backhaul link). In a typical configuration, the router routes traffic between user devices that are within the region of physical coverage of the private network (e.g., via the RAN) and one or more of the other networks via the primary backhaul link. However, in some cases, the primary backhaul link fails, and, accordingly, the router routes traffic via the secondary backhaul link (this is sometimes referred to as backhaul failover). This causes issues when a throughput of the secondary backhaul link is different than a throughput of the primary backhaul link. For example, in many cases, the secondary backhaul link has less throughput than the primary backhaul link, which causes at least some traffic to be delayed when transmitting via the secondary backhaul link.

Some implementations described herein provide a monitoring device of a private network that is connected to a router of the private network. The router is connected to a backhaul via a primary backhaul link and a secondary backhaul link and the router sends information about a status of the primary backhaul link to the monitoring device. For example, when the primary backhaul link fails, the router determines that the primary backhaul link is down and sends information indicating that the primary backhaul link is down to the monitoring device. The monitoring device, based on the information, sends at least one first message to a controller, such as a policy and charging rules (PCRF) function, of a private core network of the private network and/or at least one second message to a baseband unit (BBU) of a RAN of the private network. The at least one first message causes the controller to activate at least one route condition policy, which causes at least one route condition for a first set of user devices associated with the private network to be modified. The at least one second message causes the BBU to apply one or more spectrum sharing parameters, which causes spectrum allocation for a second set of user devices associated with the private network to be modified (e.g., some or all of the user devices associated with the private network).

In this way, the monitoring device facilitates more effective and efficient routing of traffic by the secondary backhaul link. For example, the monitoring device, by sending the at least one first message to the controller, can limit a route condition for non-essential user devices (e.g., gaming user devices) and increase a route condition for essential user devices (e.g., health monitoring user devices). As another example, the monitoring device, by sending the at least one second message to the BBU, can respectively provide different spectrum allocations to different sets of user devices, which can prioritize certain sets of user devices over others and thereby reduce traffic bottlenecks on the secondary backhaul link.

Further, some implementations described herein provide a fully automated solution to managing traffic of a private network in relation to a backhaul failover. This reduces a need of a network administrator to utilize one or more other devices, such as network diagnostic devices, to identify, diagnose, and address traffic delay issues associated with routing traffic via the secondary backhaul link. Accordingly, some implementations described herein reduce a usage of computing resources (e.g., processing resources, memory resources, communication resources, and/or power resources, among other examples) that would otherwise be used by the one or more other devices when utilized by the network administrator.

FIGS. 1A-1F are diagrams of one or more examples 100 associated with managing traffic of a private network in relation to a backhaul failover. As shown in FIGS. 1A-1F, example(s) 100 may include a router 102, a backhaul 104, a plurality of backhaul links 106 (shown as a primary backhaul link 106-1 and a secondary backhaul link 106-2), a monitoring device 108, a private core network 110, a controller 112, a RAN 114, a BBU 116, and a plurality of user devices 118 (shown as a first set of user devices 118-A, a second set of user devices 118-B, and a third set of user devices 118-C, where each set of user devices 118 includes one or more user devices 118), and/or a private network 120, which are described in more detail in connection with FIG. 2.

As shown in FIGS. 1A-1F, the router 102, the monitoring device 108, the private core network 110, the controller 112, the RAN 114, the BBU 116, and/or the plurality of user devices 118 may be included within the private network 120. For example, the router 102, the monitoring device 108, the private core network 110, the controller 112, the RAN 114, the BBU 116, and/or the plurality of user devices 118 may each be positioned at a particular virtual location within the private network 120 and/or may each be positioned at a particular physical location (e.g., a particular longitude, a particular latitude, a particular building, a particular floor, and/or a particular elevation) within the private network 120 (e.g., within a region of physical coverage associated with the private network 120). The private network 120 may provide (e.g., using the router 102, the private core network 110, the controller 112, the RAN 114, and/or the BBU 116) wireless communications and services for the plurality of user devices 118.

In some implementations, the first set of user devices 118-A may be termed "private" user devices (e.g., user devices 118 that only access resources of the private network 120), and the router 102 may route "private" traffic between the first set of user devices 118-A (e.g., via the RAN 114 and/or the BBU 116) and the private core network 110 and/or the controller 112. In some implementations, the router 102 may route at least some of the private traffic between the first set of user devices 118 and a private data network (e.g., the private data network 210 described herein in relation to FIG. 2) via the backhaul 104. In some implementations, the second set of user devices 118-B may be termed "public" user devices (e.g., user devices 118 that use the private network 120 to access a public network) and the router 102 may route "public" traffic between the second set of user devices 118-B (e.g., via the RAN 114 and/or the BBU 116) and a public core network and/or public data network (e.g., the public core network 220 and/or the public data network 230 described herein in relation to FIG. 2) via the backhaul 104. In some implementations, the third set of user devices 118-C may be termed "private/public" user devices (e.g., user devices 118 that access resources of the private network 120 and use the private network 120 to access a public network). The router 102 may route private traffic and/or public traffic to or from the third set of user devices 118-C in similar manner as that described herein in relation to the first set of user devices 118-A and the second set of user devices 118-B.

The router 102 may be connected to the backhaul 104 via the plurality of backhaul links 106. For example, the router 102 may be connected to the backhaul 104 via the primary backhaul link 106-1 and the secondary backhaul link 106-2. The primary backhaul link 106-1 may be configured to transmit private traffic and/or public traffic when the primary backhaul link 106-1 is active (e.g., when the primary backhaul link 106-1 is up and capable of transmitting the public traffic). The secondary backhaul link 106-2 may be configured to transmit the private traffic and/or the public traffic when the primary backhaul link 106-1 fails or is inactive (e.g., when the primary backhaul link 106-1 is down and incapable of transmitting the private traffic and/or the public traffic). In other words, the router 102 may be configured to route the private traffic and/or the public traffic via the primary backhaul link 106-1 when the primary backhaul link 106-1 is up, and to route the private traffic and/or the public traffic via the secondary backhaul link 106-2 when the primary backhaul link 106-1 is down (e.g., when the router 102 detects a backhaul failover).

As shown in FIG. 1A, and by reference number 122, the primary backhaul link 106-1 may fail. For example, one or more environmental conditions associated with the primary backhaul link 106-1 may cause the primary backhaul link 106-1 to be inactive or otherwise down. As shown by reference number 124, the router 102 may determine that the primary backhaul link 106-1 is down. For example, the router 102 may determine that the router 102 is not receiving traffic (e.g., private traffic and/or public traffic) via the primary backhaul link 106-1 and/or that a state of the primary backhaul link 106-1 is not active. Accordingly, the router 102 may route, based on determining that the primary backhaul link 106-1 is down (e.g., based on detecting a backhaul failover), the traffic via the secondary backhaul link 106-2. In some implementations, as shown by reference number 126, the router 102 may send information indicating that the primary backhaul link 106-1 is down to the monitoring device 108. For example, the router 102 may send (e.g., via a port of the router 102, such as an input/output (I/O) port), to the monitoring device 108, a message indicating that the router 102 detected a backhaul failover and/or that the primary backhaul link 106-1 is down.

Figure 1B:
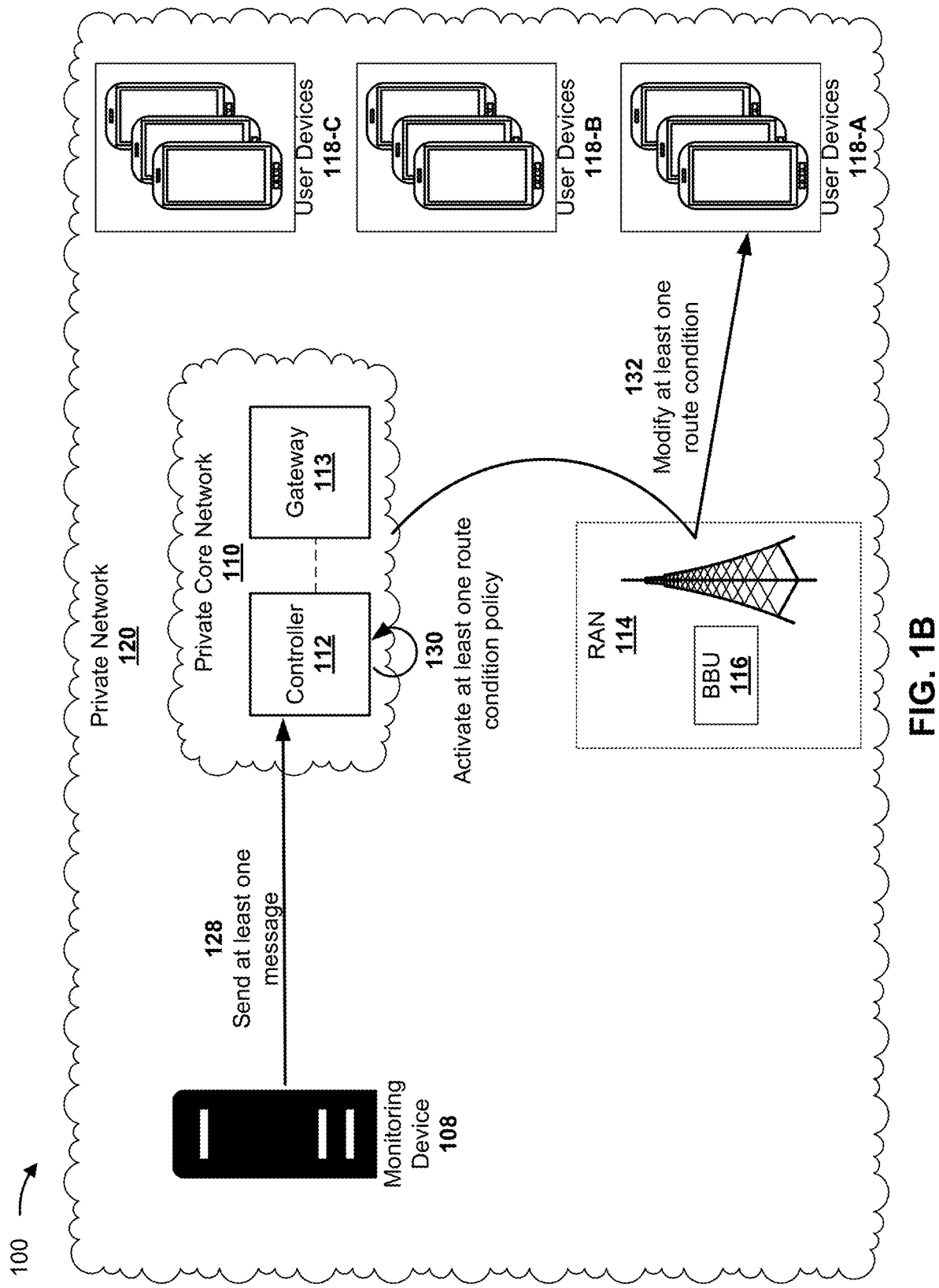

As shown in FIG. 1B, and by reference number 128, the monitoring device 108 may send at least one message to the controller 112 of the private core network 110 (e.g., based on the information indicating that the primary backhaul link 106-1 is down). For example, the monitoring device 108 may send the at least one message to the controller 112 via an Rx interface of the controller 112. In some implementations, the at least one message may be at least one Diameter message (e.g., at least one message that conforms to the Diameter protocol). The at least one message may indicate that the controller 112 is to activate at least one route condition policy. For example, the at least one message may indicate that the primary backhaul link 106-1 is down and/or may identify the at least one route condition policy.

As shown by reference number 130, the controller 112 may activate the at least one route condition policy (e.g., based on the at least one message sent to the controller 112 by the monitoring device 108). A route condition policy may indicate a throughput allocation, a bandwidth allocation, a quality of service (QoS) allocation, a bearer allocation, an access point name aggregate maximum bit rate (APN-AMBR) allocation, a throttle allocation, and/or an allocation of one or more other parameters associated with throughput for the private network. For example, the controller 112 may process (e.g., parse) the at least one message to determine that the primary backhaul link 106-1 is down. Accordingly, the controller 112 may search, based on the determination that the primary backhaul link 106-1 is down, a data structure (e.g., a database, a table, and/or an electronic file, among other examples) that includes route condition information to identify an entry that indicates the at least one route condition policy. The controller 112 may process (e.g., parse) the entry to identify the at least one route condition policy. Alternatively, when the at least one message identifies the at least one route condition policy, the controller 112 may process (e.g., parse) the at least one message to identify the at least one route condition policy. Accordingly, the controller 112 may activate the at least one route condition policy (e.g., by updating a policy table of the controller 112 to include the at least one route condition policy). Additionally, or alternatively, the controller may communicate with a gateway 113, such as a packet data network gateway (PGW), of the private core network 110 and/or the BBU 116 to activate the at least one route condition policy (e.g., communicate with the gateway 113 and/or the BBU 116 to cause the at least one route condition policy to be applied at the gateway 113 and/or the BBU 116).

As shown by reference number 132, activating the at least one route condition policy may cause at least one route condition for the first set of user devices 118-A to be modified. For example, activating the at least one route condition policy may cause a route condition to be removed (e.g., cause the first set of user devices 118-A to have no route condition), to be decreased (e.g., cause the first set of user devices 118-A to have a route condition that is less than a route condition of the first set of user devices 118-A prior to the failure of the primary backhaul link 106-1), or to be increased (e.g., cause the first set of user devices 118-A to have a route condition that is greater than a route condition of the first set of user devices 118-A prior to the failure of the primary backhaul link 106-1).

Figure 1C:
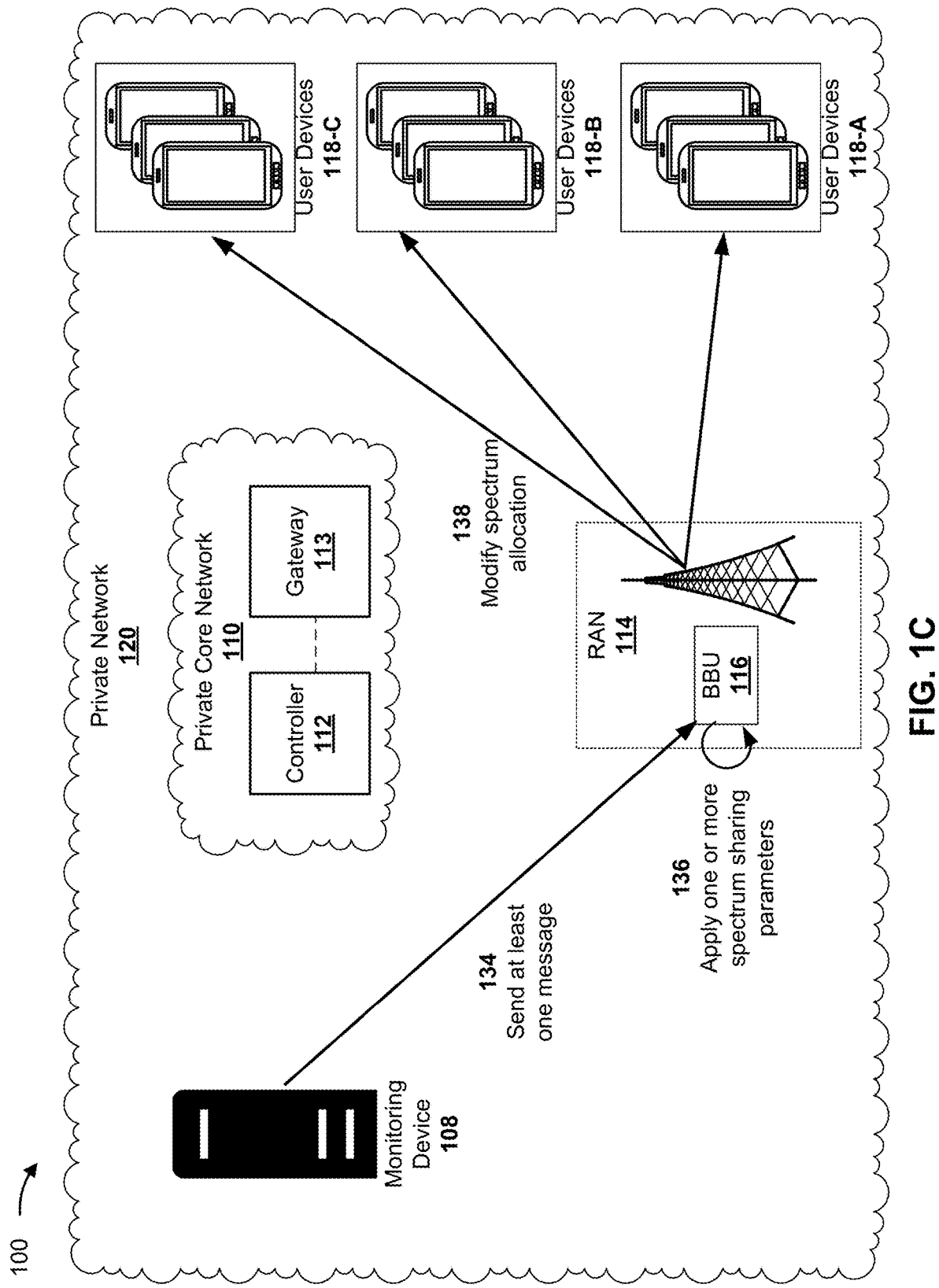

As shown in FIG. 1C, and by reference number 134, the monitoring device 108 may send at least one message (e.g., that is different than the at least one message sent to the controller 112 by the monitoring device 108) to the BBU 116 of the RAN 114 (e.g., based on the information indicating that the primary backhaul link 106-1 is down that was received by the monitoring device 108, as described herein in relation to FIG. 1A and reference number 126). For example, the monitoring device 108 may cause a secure communication session, such as an SSH protocol session, to be established between the monitoring device 108 and the BBU 116 and may send the at least one message to the BBU 116 via the secure communication session. The at least one message may indicate that the BBU 116 is to apply one or more spectrum sharing parameters for the private network 120. For example, the at least one message may indicate that the primary backhaul link 106-1 is down and/or may identify the one or more spectrum sharing parameters.

As shown by reference number 136, the BBU 116 may apply the one or more spectrum sharing parameters (e.g., based on the at least one message sent to the BBU 116 by the monitoring device 108). The one or more spectrum sharing parameters may include, for example, a parameter associated with allocation of available spectrum of the BBU 116 (e.g., in terms of a percentage of total available spectrum of the BBU 116) for the private network 120, a parameter associated with a data rate allocation for the private network 120 (e.g., in terms of Megabytes per second (Mbps)), and/or another similar parameter. For example, the BBU 116 may process (e.g., parse) the at least one message to determine that the primary backhaul link 106-1 is down. Accordingly, the BBU 116 may search, based on the determination that the primary backhaul link 106-1 is down, a data structure (e.g., a database, a table, and/or an electronic file, among other examples) that includes spectrum sharing parameter information to identify an entry that indicates the one or more spectrum sharing parameters. The BBU 116 may process (e.g., parse) the entry to identify the one or more spectrum sharing parameters. Alternatively, when the at least one message identifies the one or more spectrum sharing parameters, the BBU 116 may process (e.g., parse) the at least one message to identify the one or more spectrum sharing parameters. Accordingly, the BBU 116 may apply the one or more spectrum sharing parameters (e.g., by updating a spectrum allocation configuration of the BBU 116 and/or the RAN 114 to include the one or more spectrum sharing parameters).

As shown by reference number 138, applying the one or more spectrum sharing parameters may cause a spectrum allocation for the first set of user devices 118-A, the second set of user devices 118-B and/or the third set of user devices 118-C to be modified. For example, applying the one or more spectrum sharing parameters may cause the spectrum allocation to be removed (e.g., cause the first set of user devices 118-A, the second set of user devices 118-B and/or the third set of user devices 118-C to have no spectrum allocation), to be decreased (e.g., cause the first set of user devices 118-A, the second set of user devices 118-B and/or the third set of user devices 118-C to have a spectrum allocation that is less than a spectrum allocation of the first set of user devices 118-A, the second set of user devices 118-B and/or the third set of user devices 118-C prior to the failure of the primary backhaul link 106-1), or to be increased (e.g., cause the first set of user devices 118-A, the second set of user devices 118-B and/or the third set of user devices 118-C to have a spectrum allocation that is greater than a spectrum allocation of the first set of user devices 118-A, the second set of user devices 118-B and/or the third set of user devices 118-C prior to the failure of the primary backhaul link 106-1).

Figure 1D:
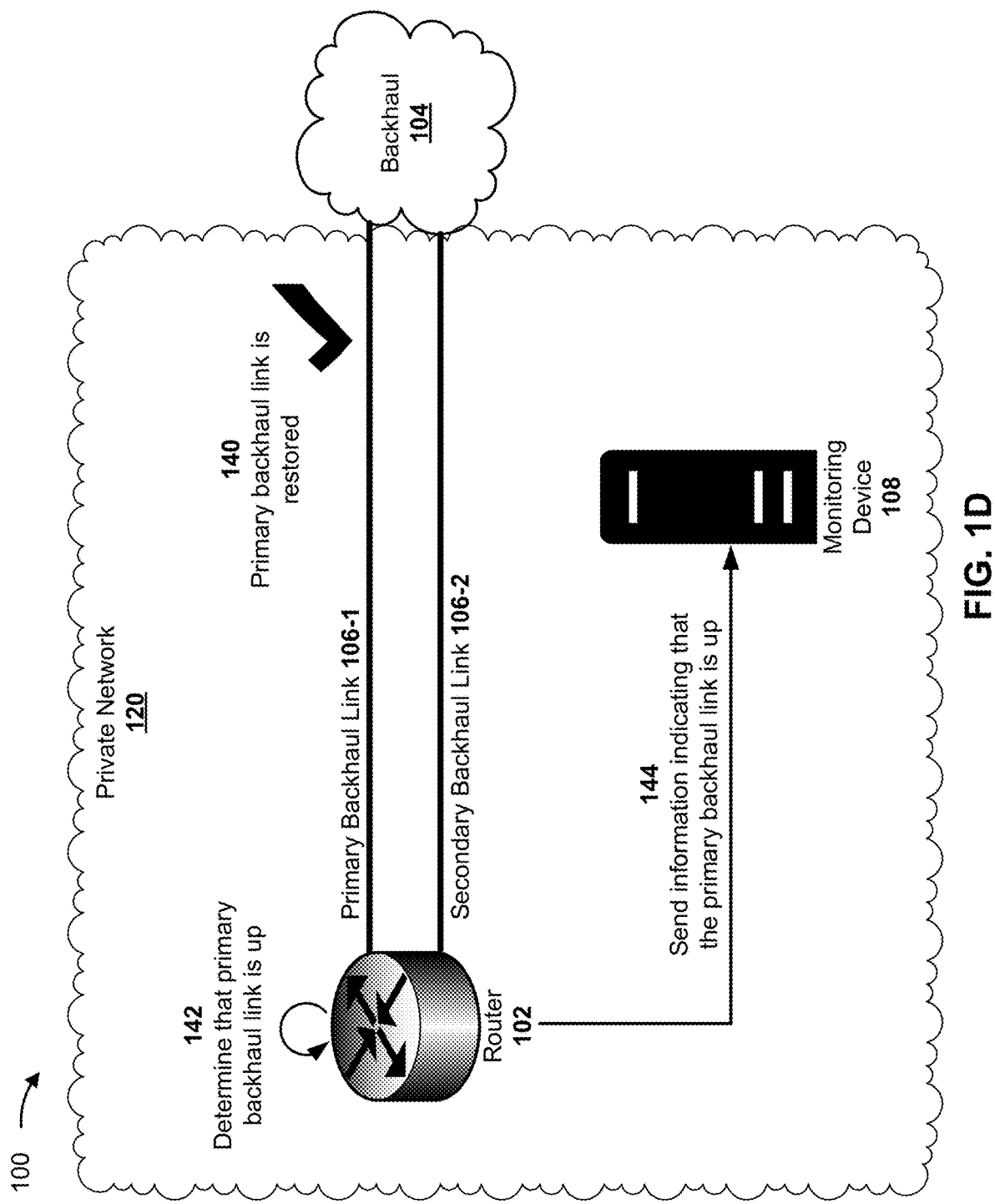

As shown in FIG. 1D, and by reference number 140, the primary backhaul link 106-1 may be restored. For example, one or more environmental conditions associated with the primary backhaul link 106-1 may cause the primary backhaul link 106-1 to be active or otherwise up. As shown by reference number 142, the router 102 may determine that the primary backhaul link 106-1 is up. For example, the router 102 may determine that the state of the primary backhaul link 106-1 is active. Accordingly, the router 102 may route, based on determining that the primary backhaul link 106-1 is up (e.g., based on detecting that a backhaul failover has ceased), the traffic via the primary backhaul link 106-1 (instead of the secondary backhaul link 106-2). In some implementations, as shown by reference number 144, the router 102 may send information indicating that the primary backhaul link 106-1 is up to the monitoring device 108. For example, the router 102 may send (e.g., via a port of the router 102, such as an I/O port), to the monitoring device 108, a message indicating that the router 102 detected that a backhaul failover has ceased and/or that the primary backhaul link 106-1 is up.

Figure 1E:
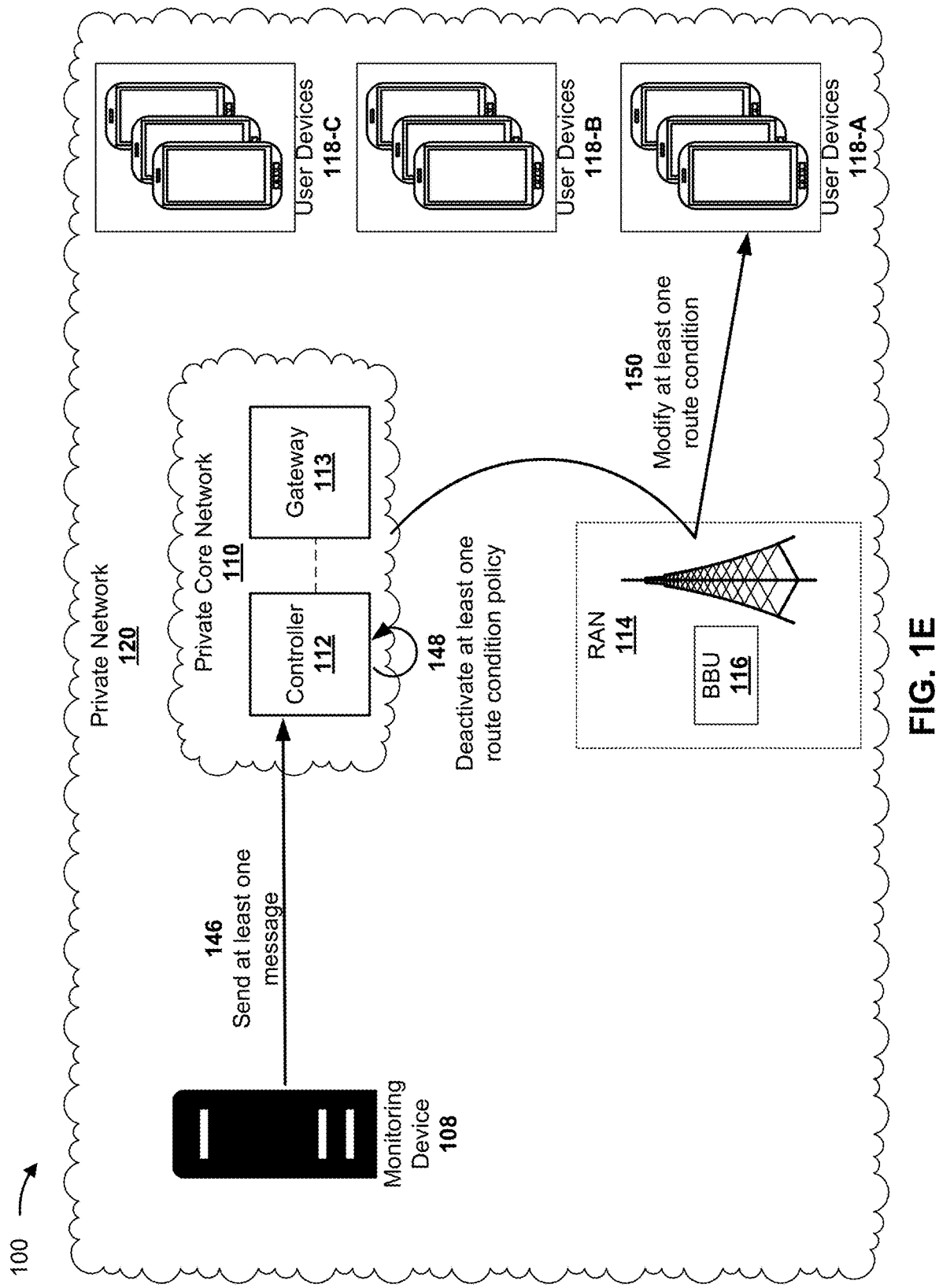

As shown in FIG. 1E, and by reference number 146, the monitoring device 108 may send at least one message (e.g., that is different than other messages described herein) to the controller 112 of the private core network 110 (e.g., based on the information indicating that the primary backhaul link 106-1 is up). For example, the monitoring device 108 may send the at least one message to the controller 112 via the Rx interface of the controller 112. In some implementations, the at least one message may be at least one Diameter message. The at least one message may indicate that the controller 112 is to deactivate the at least one route condition policy (e.g., that was activated by the controller 112 as described herein in relation to FIG. 1B and reference number 130). For example, the at least one message may indicate that the primary backhaul link 106-1 is up and/or may identify the at least one route condition policy.

As shown by reference number 148, the controller 112 may deactivate the at least one route condition policy (e.g., based on the at least one message sent to the controller 112 by the monitoring device 108). For example, the controller 112 may process (e.g., parse) the at least one message to determine that the primary backhaul link 106-1 is up. Accordingly, the controller 112 may search, based on the determination that the primary backhaul link 106-1 is up, the data structure that includes route condition information to identify the entry that indicates the at least one route condition policy. The controller 112 may process (e.g., parse) the entry to identify the at least one route condition policy. Alternatively, when the at least one message identifies the at least one route condition policy, the controller 112 may process (e.g., parse) the at least one message to identify the at least one route condition policy. Accordingly, the controller 112 may deactivate the at least one route condition policy (e.g., by updating the policy table of the controller 112 to not include the at least one route condition policy). Additionally, or alternatively, the controller may communicate with the gateway 113 of the private core network 110 and/or the BBU 116 to deactivate the at least one route condition policy (e.g., communicate with the gateway 113 and/or the BBU 116 to cause the at least one route condition policy to not be applied at the gateway 113 and/or the BBU 116).

As shown by reference number 150, deactivating the at least one route condition policy may cause at least one route condition for the first set of user devices 118-A to be modified. For example, deactivating the at least one route condition policy may cause a route condition to be removed (e.g., cause the first set of user devices 118-A to have no route condition), to be decreased (e.g., cause the first set of user devices 118-A to have a route condition that is less than a route condition of the first set of user devices 118-A during a period of time when the at least one route condition policy was activated), or to be increased (e.g., cause the first set of user devices 118-A to have a route condition that is greater than a route condition of the first set of user devices 118-A during the period of time when the at least one route condition policy was activated).

Figure 1F:
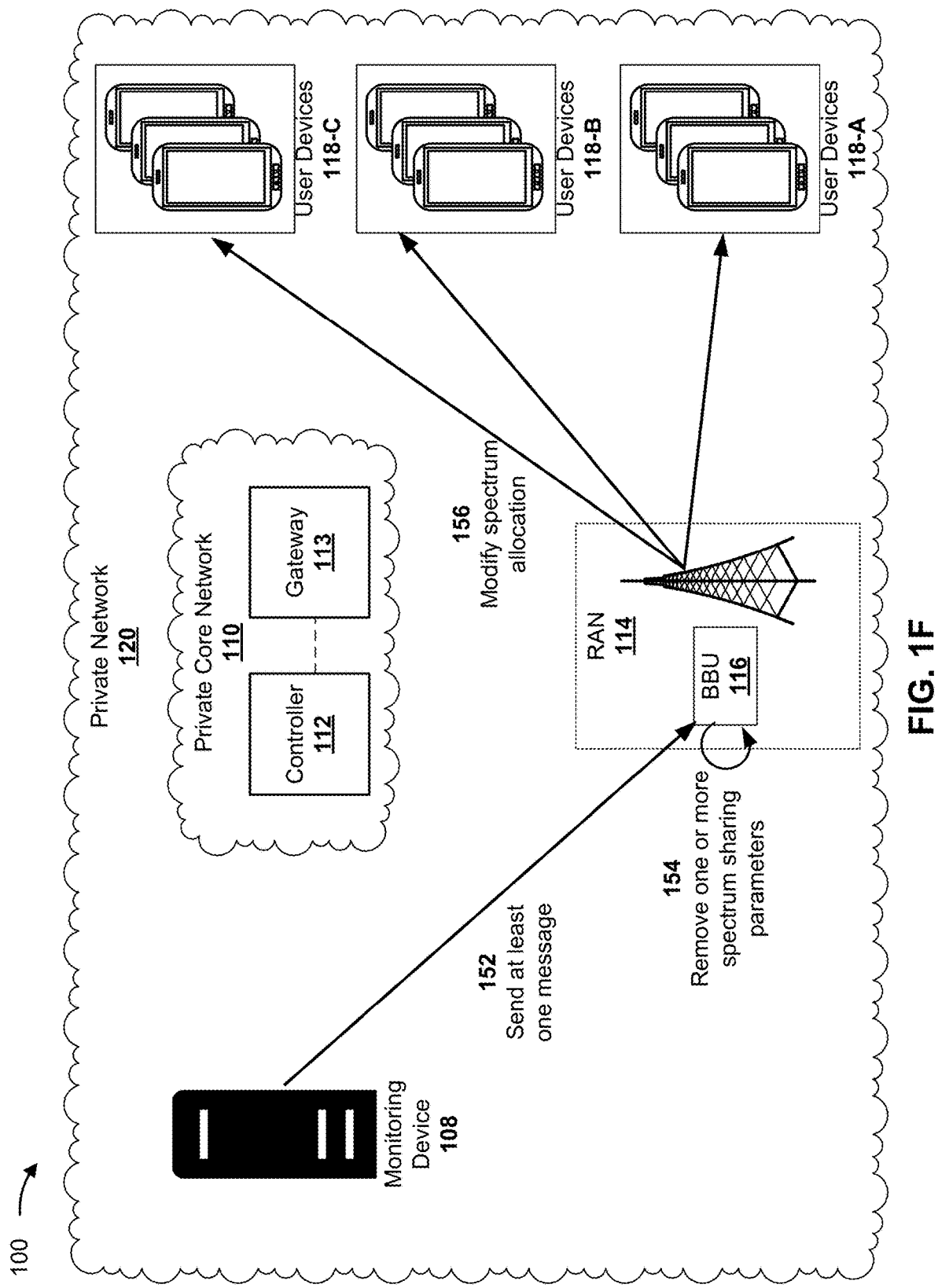

As shown in FIG. 1F, and by reference number 152, the monitoring device 108 may send at least one message (e.g., that is different than other messages described herein) to the BBU 116 of the RAN 114 (e.g., based on the information indicating that the primary backhaul link 106-1 is up that was received by the monitoring device 108, as described herein in relation to FIG. 1D and reference number 144). For example, the monitoring device 108 may cause a secure communication session, such as an SSH protocol session, to be established between the monitoring device 108 and the BBU 116 and may send the at least one message to the BBU 116 via the secure communication session. The at least one message may indicate that the BBU 116 is to remove the one or more spectrum sharing parameters. For example, the at least one message may indicate that the primary backhaul link 106-1 is up and/or may identify the one or more spectrum sharing parameters.

As shown by reference number 154, the BBU 116 may remove the one or more spectrum sharing parameters (e.g., based on the at least one message sent to the BBU 116 by the monitoring device 108). For example, the BBU 116 may process (e.g., parse) the at least one message to determine that the primary backhaul link 106-1 is up. Accordingly, the BBU 116 may search, based on the determination that the primary backhaul link 106-1 is up, the data structure that includes spectrum sharing parameter information to identify the entry that indicates the one or more spectrum sharing parameters. The BBU 116 may process (e.g., parse) the entry to identify the one or more spectrum sharing parameters. Alternatively, when the at least one message identifies the one or more spectrum sharing parameters, the BBU 116 may process (e.g., parse) the at least one message to identify the one or more spectrum sharing parameters. Accordingly, the BBU 116 may remove the one or more spectrum sharing parameters (e.g., by updating the spectrum allocation configuration of the BBU 116 and/or the RAN 114 to not include the one or more spectrum sharing parameters).

As shown by reference number 156, removing the one or more spectrum sharing parameters may cause a spectrum allocation for the first set of user devices 118-A, the second set of user devices 118-B and/or the third set of user devices 118-C to be modified. For example, removing the one or more spectrum sharing parameters may cause the spectrum allocation to be removed (e.g., cause the first set of user devices 118-A, the second set of user devices 118-B and/or the third set of user devices 118-C to have no spectrum allocation), to be decreased (e.g., cause the first set of user devices 118-A, the second set of user devices 118-B and/or the third set of user devices 118-C to have a spectrum allocation that is less than a spectrum allocation of the first set of user devices 118-A, the second set of user devices 118-B and/or the third set of user devices 118-C during a period of time when the one or more spectrum sharing parameters were applied), or to be increased. That is, removing the one or more spectrum sharing parameters may cause the first set of user devices 118-A, the second set of user devices 118-B and/or the third set of user devices 118-C to have a spectrum allocation that is greater than a spectrum allocation of the first set of user devices 118-A, the second set of user devices 118-B and/or the third set of user devices 118-C during the period of time when the one or more spectrum sharing parameters were applied.

As indicated above, FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of one or more examples 100 may perform one or more functions described as being performed by another set of devices of one or more examples 100.

Figure 2:
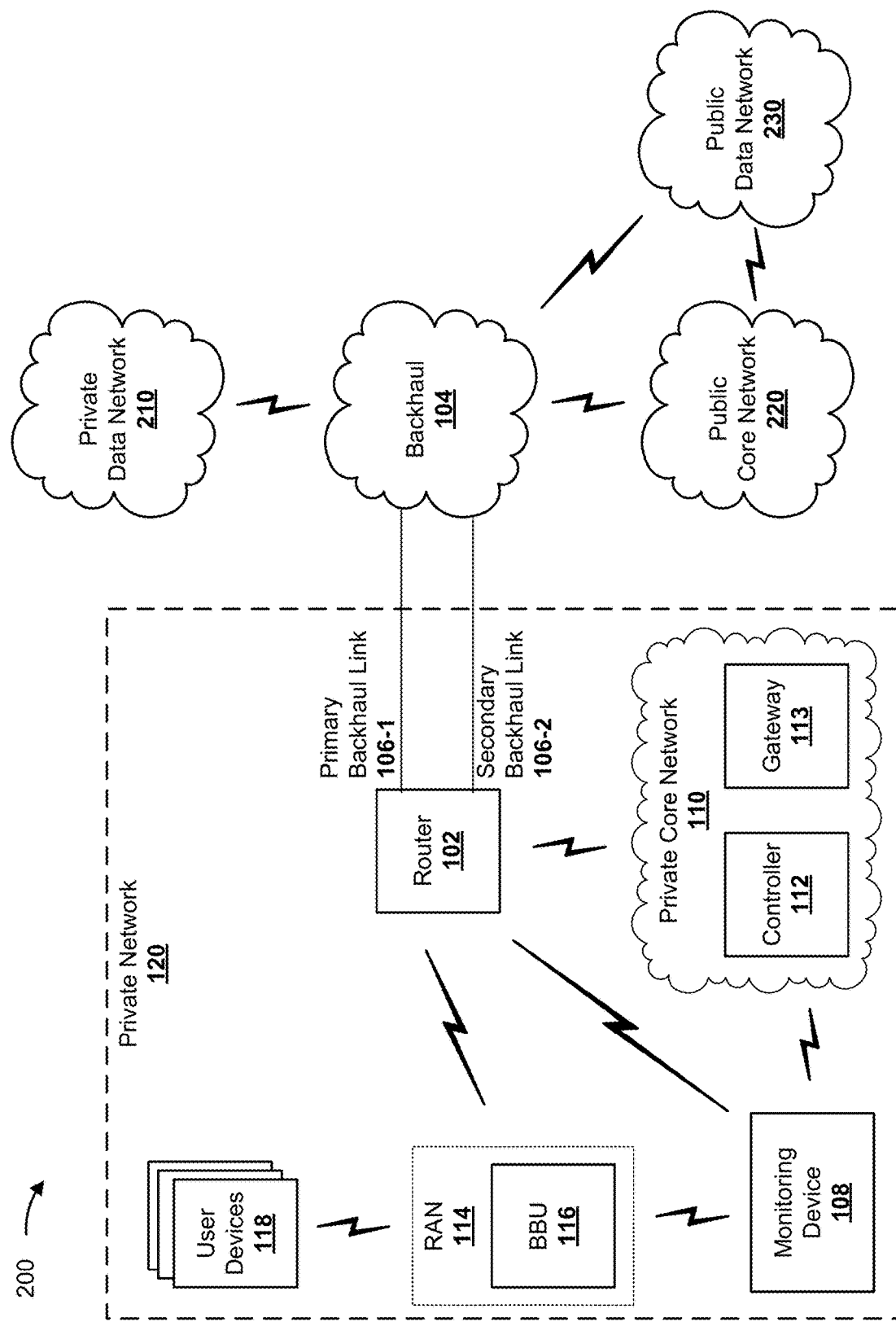
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the router 102, the backhaul 104, the plurality of backhaul links 106 (e.g., the primary backhaul link 106-1 and the secondary backhaul link 106-2), the monitoring device 108, the private core network 110, the controller 112, the gateway 113, the RAN 114, the BBU 116, the plurality of user devices 118, the private network 120, a private data network 210, a public core network 220, and/or a public data network 230. Devices of environment 200 may interconnect via wired connections, wireless connections, or a combination of wired and wireless connections.

The router 102 includes one or more devices capable of receiving, processing, storing, routing, and/or providing traffic (e.g., private traffic and/or public traffic) in a manner described herein. For example, the router 102 may include a router, such as a label switching router (LSR), a label edge router (LER), an ingress router, an egress router, a provider router (e.g., a provider edge router or a provider core router), a virtual router, or another type of router. Additionally, or alternatively, the router 102 may include a gateway, a switch, a firewall, a hub, a bridge, a reverse proxy, a server (e.g., a proxy server, a cloud server, or a data center server), a load balancer, and/or a similar device. In some implementations, the router 102 may be a physical device implemented within a housing, such as a chassis. In some implementations, the router device may be a virtual device implemented by one or more computing devices of a cloud computing environment or a data center. In some implementations, the router 102 may be a cell site router of the private network 120.

The backhaul 104 provides the plurality of backhaul links 106 to connect the private network 120 and the private data network 210 and/or to connect the private network 120 and the public core network 220 and/or the public data network 230. The plurality of backhaul links 106 may comprise wired backhaul links 106 (e.g., fiber-based backhaul links) and/or wireless backhaul links (e.g., point-to-point and/or point-to-multipoint wireless backhaul links). In some implementations, the backhaul 104 includes the primary backhaul link 106-1 and the secondary backhaul link 106-2, as described elsewhere herein.

The monitoring device 108 includes one or more devices capable of receiving, generating, storing, processing, providing, and/or routing information, as described elsewhere herein. The monitoring device 108 may include a communication device and/or a computing device. For example, the monitoring device 108 may include a server, such as an application server, a client server, a web server, a database server, a host server, a proxy server, a virtual server (e.g., executing on computing hardware), or a server in a cloud computing system. In some implementations, the monitoring device 108 includes computing hardware used in a cloud computing environment.

The private core network 110 includes various types of core network architectures, such as a 5G Next Generation (NG) Core, a Long-Term Evolution (LTE) Evolved Packet Core (EPC), and/or the like. The private core network 110 may be accessible to the private network 120 (e.g., to user devices 118 virtually and/or physically located within the private network 120). In some implementations, the private core network 110 may be implemented on physical devices, such as a gateway, a mobility management entity, and/or the like. In some implementations, the hardware and/or software implementing the private core network 110 may be virtualized (e.g., through the use of network function virtualization and/or software-defined networking), thereby allowing for the use of composable infrastructure when implementing the private core network 110. In this way, networking, storage, and compute resources can be allocated to implement the functions of private core network 110 in a flexible manner as opposed to relying on dedicated hardware and software to implement these functions.

The controller 112 includes one or more devices, such as one or more server devices, capable of providing policy control decision and flow-based charging control functionalities. For example, the controller 112 may provide network control regarding service data flow detection, gating, quality of service (QoS) and flow-based charging, and/or the like. In some implementations, the controller 112 may determine how a certain service data flow is to be treated and may ensure that user plane traffic mapping and treatment is in accordance with a user subscription profile. In some implementations, the controller 112 may activate a route condition policy (e.g., by updating a policy table of the controller 112 to include the at least one route condition policy) to cause a route condition for a plurality of user devices 118 to be modified. In some implementations, the controller 112 may be a policy and charging rules function (PCRF).

The gateway 113 includes one or more devices capable of providing connectivity for the user device 118 (e.g., to the private core network 110, the private data network 210, the public core network 220, and/or the public data network 230). For example, the gateway 113 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, the gateway 113 may be a packet data network gateway (PGW).

The RAN 114 may support, for example, a cellular radio access technology (RAT). The RAN 114 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 118. The RAN 114 may transfer traffic (e.g., private traffic and/or public traffic) between the user device 118 (e.g., using a cellular RAT), one or more base stations, the private core network 110 (e.g., via the router 102), the private data network 210 (e.g., via the router 102 and the backhaul 104), and/or the public core network 220 and/or the public data network 230 (e.g., via the router and the backhaul 104). The RAN 114 may provide one or more cells that cover a region of physical coverage associated with the private network 120.

In some implementations, the RAN 114 may perform scheduling and/or resource management for a user device 118 covered by the RAN 114 (e.g., a user device 118 covered by a cell provided by the RAN 114). In some implementations, the RAN 114 may be controlled or coordinated by the BBU 116, which may perform spectrum allocation, load balancing, and/or network-level configuration, among other examples. In some implementations, the BBU 116 may apply one or more spectrum sharing parameters (e.g., by updating a spectrum allocation configuration of the BBU 116 and/or the RAN 114 to include the one or more spectrum sharing parameters) to cause a spectrum allocation for a plurality of user devices 118 to be modified.

The user device 118 includes one or more devices capable of receiving, generating, storing, processing, and/or providing information, as described elsewhere herein. The user device 118 may include a communication device and/or a computing device. For example, the user device 118 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 118 may include an Internet of things (IoT) user device, such as a narrowband IoT (NB-IoT) user device, an industrial Internet of Things (IIoT) user device, and/or another type of IoT user device. In some implementations, the user device 118 may be a private user device, a public user device, or a private/public user device, as described elsewhere herein.

The private network 120 includes an environment that delivers computing as a service, whereby shared resources, services, and/or other resources may be provided to a user device 118. The private network 120 may provide computation, software, data access, storage, and/or other services that do not require end-user knowledge of a physical location and configuration of a system and/or a device that delivers the services.

The private data network 210 includes one or more wired and/or wireless networks associated with the private network 120. For example, the private data network 210 may include a cellular network (e.g., a 5G network, a 4G network, a LTE network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The public core network 220 includes various types of core network architectures, such as a 5G NG Core, an LTE EPC, and/or the like. The public core network 220 may be separate from the private network 120 and/or the private core network 110. In some implementations, the public core network 220 may be implemented on physical devices, such as a gateway, a mobility management entity, and/or the like. In some implementations, the hardware and/or software implementing the public core network 220 may be virtualized (e.g., through the use of network function virtualization and/or software-defined networking), thereby allowing for the use of composable infrastructure when implementing the public core network 220. In this way, networking, storage, and compute resources can be allocated to implement the functions of public core network 220 in a flexible manner as opposed to relying on dedicated hardware and software to implement these functions.

The public data network 230 includes one or more wired and/or wireless networks associated with the public core network 220. For example, the private data network 210 may include a cellular network (e.g., a 5G network, a 4G network, a LTE network, a 3G network, a CDMA network, and/or the like), a PLMN, a LAN, WAN, a MAN, a telephone network (e.g., the PSTN), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
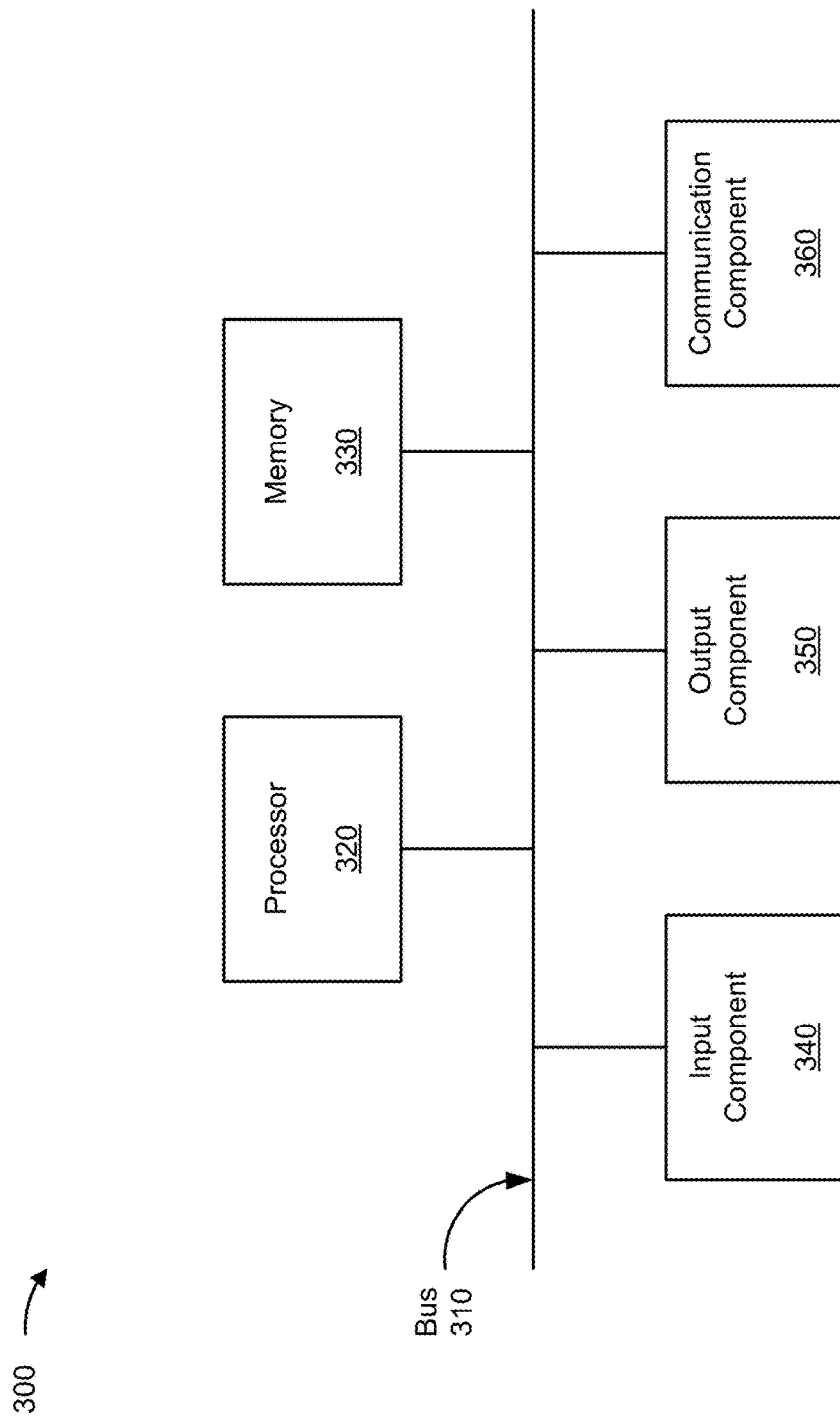
FIG. 3 is a diagram of example components of one or more devices of FIG. 2.

FIG. 3 is a diagram of example components of a device 300, which may correspond to the router 102, the monitoring device 108, the controller 112, the gateway 113, the BBU 116, and/or the plurality of user devices 118. In some implementations, the router 102, the monitoring device 108, the controller 112, the gateway 113, the BBU 116, and/or the plurality of user devices 118 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with systems and methods for managing traffic of a private network in relation to a backhaul failover. In some implementations, one or more process blocks of FIG. 4 may be performed by a device (e.g., monitoring device 108). In some implementations, one or more process blocks of FIG. 4 may be performed by another device or a group of devices separate from or including the device, such as a router (e.g., router 102), a controller (e.g., controller 112), a gateway (e.g., gateway 113), a BBU of a RAN (e.g., the BBU 116), and/or a user device (e.g., user device 118). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include obtaining, from a router, information indicating that a primary backhaul link of a private network is down (block 410). For example, the device may obtain, from a router, information indicating that a primary backhaul link of a private network is down, as described above.

As further shown in FIG. 4, process 400 may include sending, based on the information, at least one first message to a controller of the private network (block 420). For example, the device may send, based on the information, at least one first message to a controller of the private network, as described above. In some implementations, the at least one first message is to cause the controller to activate at least one route condition policy. In some implementations, the at least one first message to the controller is to cause at least one route condition for a first set of user devices associated with the private network to be modified.

As further shown in FIG. 4, process 400 may include sending, based on the information, at least one second message to a BBU of the private network (block 430). For example, the device may send, based on the information, at least one second message to a BBU of the private network, as described above. In some implementations, the at least one second message is to cause the BBU to apply one or more spectrum sharing parameters for the private network. In some implementations, the at least one second message is sent to the BBU via a secure communication session. In some implementations, the at least one second message to the BBU is to cause spectrum allocation for a second set of user devices associated with the private network to be modified.

As further shown in FIG. 4, process 400 may include obtaining, from the router, additional information indicating that the primary backhaul link of the private network is up (block 440). For example, the device may obtain, from the router, additional information indicating that the primary backhaul link of the private network is up, as described above.

As further shown in FIG. 4, process 400 may include sending, based on the additional information, at least one third message to the controller (block 450). For example, the device may send, based on the additional information, at least one third message to the controller, as described above. In some implementations, the at least one third message is to cause the controller to deactivate the at least one route condition policy. In some implementations, the at least one third message to the controller is to cause at least one route condition for the first set of user devices associated with the private network to be modified.

As further shown in FIG. 4, process 400 may include sending, based on the additional information, at least one fourth message to the BBU (block 460). For example, the device may send, based on the additional information, at least one fourth message to the BBU, as described above. In some implementations, the at least one fourth message is to cause the BBU to remove the one or more spectrum sharing parameters. In some implementations, the at least one fourth message is sent to the BBU via a secure communication session. In some implementations, the at least one fourth message to the BBU is to cause spectrum allocation for the second set of user devices associated with the private network to be modified.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining, by a device and from a router, information indicating that a primary backhaul link of a private network is down;
   sending, by the device and based on the information, at least one message to a controller of the private network, wherein:
      the at least one message indicates that the controller is to activate at least one route condition policy, and
      the at least one message, when received by the controller, is to cause the controller to activate the at least one route condition policy; and
   sending, based on the information, at least one additional message to a baseband unit (BBU) of the private network,
      wherein the at least one additional message includes information about one or more spectrum sharing parameters for the private network.

2. The method of claim 1, wherein the at least one message to the controller is to cause at least one route condition for a plurality of user devices associated with the private network to be decreased.

3. The method of claim 1, wherein the controller is a policy and charging rules (PCRF) function.

4. The method of claim 1, further comprising:
   obtaining, from the router, additional information indicating that the primary backhaul link of the private network is up; and
   sending, by the device and based on the additional information, at least one additional message to the controller, wherein:
      the at least one additional message indicates that the controller is to deactivate the at least one route condition policy, and
      the at least one additional message, when received by the controller, is to cause the controller to deactivate the at least one route condition policy.

5. The method of claim 4, wherein the at least one additional message to the controller is to cause at least one route condition for a plurality of user devices associated with the private network to be increased.

6. The method of claim 1, wherein:
   the at least one additional message, when received by the BBU, is to cause the BBU to apply the one or more spectrum sharing parameters.

7. The method of claim 6, wherein sending the at least one additional message to the BBU comprises:
   causing a secure communication session to be established between the device and the BBU; and
   sending the at least one additional message to the BBU via the secure communication session.

8. A device, comprising:
   one or more processors configured to:
      obtain, from a router, information indicating that a primary backhaul link of a private network is down;
      send, based on the information, at least one message to a baseband unit (BBU) of the private network, wherein:
         the at least one message indicates that the BBU is to apply one or more spectrum sharing parameters for the private network, and
         the at least one message, when received by the BBU, is to cause the BBU to apply the one or more spectrum sharing parameters; and
      send, based on additional information indicating that the primary backhaul link of the private network is up, at least one additional message to the BBU,
         wherein the at least one additional message indicates that the BBU is to remove the one or more spectrum sharing parameters.

9. The device of claim 8, wherein the one or more processors, to send the at least one message to the BBU, are configured to:
   send the at least one message to the BBU via a secure communication session.

10. The device of claim 8, wherein the at least one message, when received by the BBU, is to cause a spectrum allocation for a plurality of user devices associated with the private network to be decreased.

11. The device of claim 8, wherein the one or more processors are further configured to:
   obtain, from the router, the additional information indicating that the primary backhaul link of the private network is up.

12. The device of claim 11, wherein the at least one additional message, when received by the BBU, is to cause a spectrum allocation for a plurality of user devices associated with the private network to be increased.

13. The device of claim 8, wherein the one or more processors are further configured to:
   send, based on the information, at least one additional message to a controller of the private network, wherein:
      the at least one additional message indicates that the controller is to activate at least one route condition policy, and
      the at least one additional message, when received by the controller, is to cause the controller to activate the at least one route condition policy.

14. The device of claim 13, the controller is a policy and charging rules (PCRF) function.

15. The device of claim 13, wherein the at least one additional message to the controller is to cause at least one route condition for a plurality of user devices associated with the private network to be decreased.

16. A non-transitory computer-readable medium storing a set of instructions, the set of instructions comprising:
   one or more instructions that, when executed by one or more processors of a device, cause the device to:
      obtain, from a router, information indicating that a primary backhaul link of a private network is down;
      send, based on the information, at least one first message to a controller of the private network,
         wherein the at least one first message is to cause the controller to activate at least one route condition policy; and
      send, based on the information, at least one second message to a baseband unit (BBU) of the private network,
         wherein the at least one second message is to cause the BBU to apply one or more spectrum sharing parameters for the private network.

17. The non-transitory computer-readable medium of claim 16, wherein:
   the at least one second message is sent to the BBU via a secure communication session.

18. The non-transitory computer-readable medium of claim 16, wherein:
the at least one first message to the controller is to cause at least one route condition for a first set of user devices associated with the private network to be modified; and
the at least one second message to the BBU is to cause spectrum allocation for a second set of user devices associated with the private network to be modified.

19. The non-transitory computer-readable medium of claim 16, wherein the one or more instructions, when executed by the one or more processors of the device, further cause the device to:
obtain, from the router, additional information indicating that the primary backhaul link of the private network is up;
send, based on the additional information, at least one third message to the controller,
wherein the at least one third message is to cause the controller to deactivate the at least one route condition policy; and
send, based on the additional information, at least one fourth message to the BBU, wherein the at least one fourth message is to cause the BBU to remove the one or more spectrum sharing parameters.

20. The non-transitory computer-readable medium of claim 19, wherein:
the at least one third message to the controller is to cause at least one route condition for a first set of user devices associated with the private network to be modified; and
the at least one fourth message to the BBU is to cause spectrum allocation for a second set of user devices associated with the private network to be modified.

\* \* \* \* \*